United States Patent [19]

Yoda

[11] Patent Number: 5,685,010
[45] Date of Patent: Nov. 4, 1997

[54] DATA TRANSFER CONTROL DEVICE FOR CONTROLLING DATA TRANSFER BETWEEN SHARED MEMORIES OF NETWORK CLUSTERS

[75] Inventor: Shigeki Yoda, Yamanashi, Japan

[73] Assignee: NEC Corporation, Tokyo, Japan

[21] Appl. No.: 603,839

[22] Filed: Feb. 22, 1996

[30] Foreign Application Priority Data

Feb. 22, 1995 [JP] Japan .................... 7-033633

[51] Int. Cl.⁶ .................... G06F 13/00; G06F 13/18
[52] U.S. Cl. .................... 395/800; 395/412; 395/824; 395/860; 395/885; 395/386; 395/853
[58] Field of Search .................... 395/800, 412, 395/824, 860, 885, 386, 853, 478

[56] References Cited

U.S. PATENT DOCUMENTS

| | | | |
|---|---|---|---|
| 4,974,145 | 11/1990 | Aoyama et al. | 395/800 |
| 5,307,056 | 4/1994 | Colwell et al. | 395/800 |
| 5,454,092 | 9/1995 | Sibigtroth | 395/412 |

FOREIGN PATENT DOCUMENTS

| | | |
|---|---|---|
| 61-10348 | 1/1986 | Japan . |
| 06104910 | 4/1994 | Japan . |

*Primary Examiner*—Tod R. Swann
*Assistant Examiner*—James Peikari
*Attorney, Agent, or Firm*—Sughrue,Mion,Zinn,Macpeak & Seas, PLLC

[57] ABSTRACT

A data transfer control device comprising an instruction decoding unit for receiving an transfer instruction from an arithmetic processing unit provided in the cluster and decoding the content thereof, some instruction storage units for storing the transfer instruction, a shared memory access unit for reading and writing the data through access to the shared memory provided in the cluster, a data transfer unit for delivering the data read out by the shared memory access unit to the network among clusters, as well as delivering the received data through the network among clusters to the shared memory access unit, and a transfer control unit for controlling the shared memory access control unit and the data transfer unit according to the transfer instruction which is read out from the instruction storage unit, wherein the instruction decoding unit classifies the transfer instruction into an urgent transfer instruction or a non-urgent transfer instruction on the basis of the decoded result thereof, so to store it into one of the instruction storage unit separately, and the transfer control unit reads out the transfer instruction preferentially from the instruction storage unit which stores the urgent transfer instruction.

11 Claims, 4 Drawing Sheets

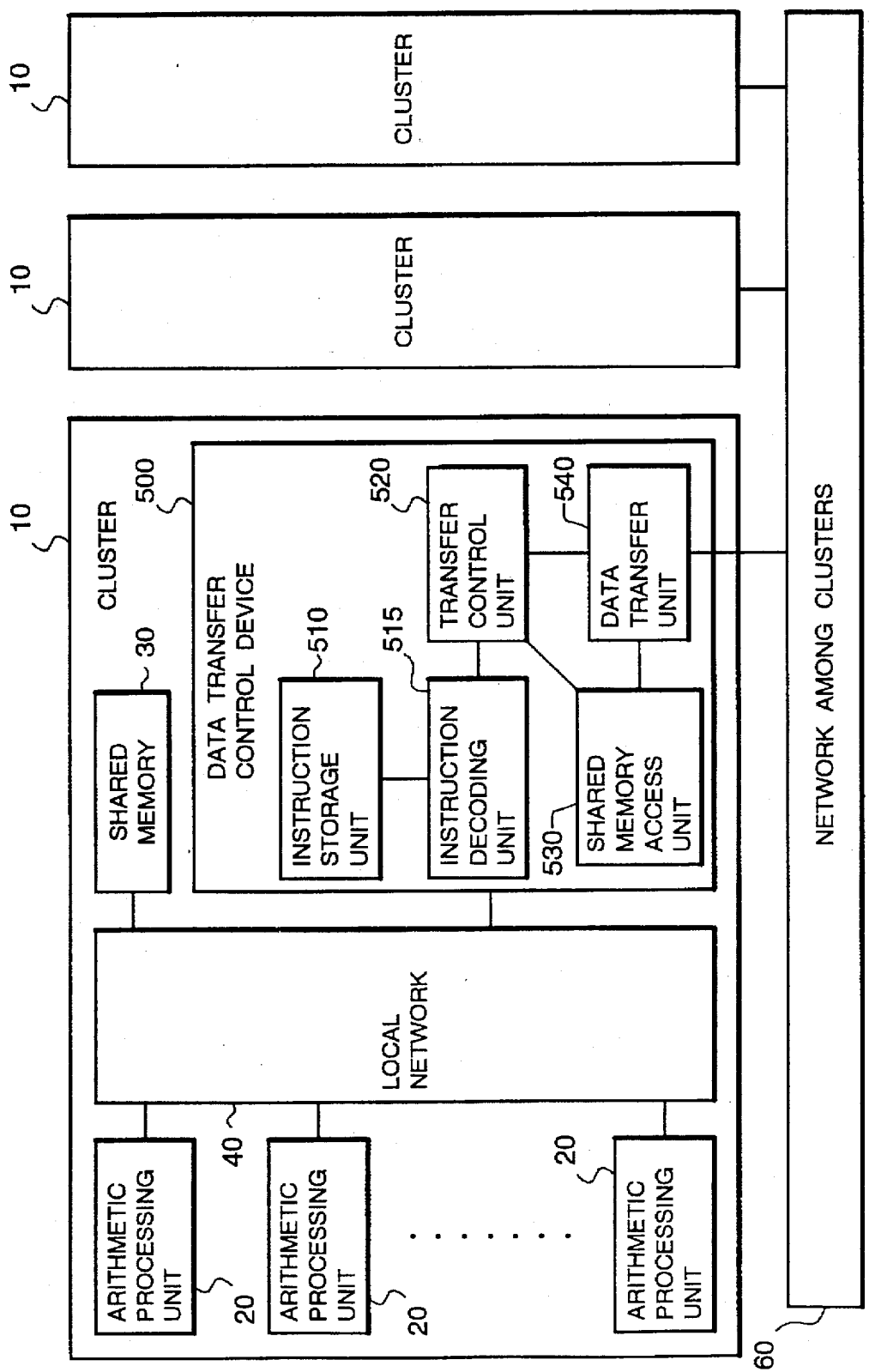

1

DATA TRANSFER CONTROL DEVICE FOR CONTROLLING DATA TRANSFER BETWEEN SHARED MEMORIES OF NETWORK CLUSTERS

BACKGROUNDS OF THE INVENTION

1. Field of the Invention

The present invention relates to a data transfer control device for controlling data transfer from a shared memory of a cluster to a shared memory of another cluster, in an information processing system by the use of a computer.

2. Description of the Related Art

In an information processing system connecting several clusters through a network, data transfer is controlled by a data transfer control unit provided in each cluster in order to transfer data between clusters.

As illustrated in FIG. 4, this kind of a conventional data transfer control unit 500 comprises an instruction storage unit 515 for storing data transfer instructions delivered from an arithmetic processing unit 20 of the same cluster 10, an instruction decoding unit 510 for reading and decoding the transfer instructions from the instruction storage unit 515, a shared memory access unit 530 for reading and writing data through access to a shared memory 30 of the same cluster 10, a data transfer unit 540 for delivering data to a network 60 among clusters, and a transfer control unit 520 for controlling the shared memory access unit 530 and the data transfer unit 540 according to the instruction of the instruction decoding unit 510. Every cluster 10 has the same organization. In thus-constituted data transfer control unit 500, data transfer control is performed as follows.

At first, when the instruction storage unit 515 receives a data transfer instruction, the instruction decoding unit 510 reads out the transfer instruction from the instruction storage unit 515 so to decode the instruction. The transfer control unit 520 controls each unit according to the decoded transfer instruction. For example, when a transfer instruction is to transfer data from the shared memory 30 of the same cluster 10 to a shared memory 30 of another cluster 10, the transfer control unit 520 receives from the instruction decoding unit 510 such information as reading starting address in the same cluster, size of transfer data, and writing starting address in a cluster to which the data is sent, and gives a reading instruction from the shared memory in every unit of data transfer process to the shared memory access unit 530.

The shared memory access unit 530 sends to the data transfer unit 540 the data which has been read out according to the instruction from the transfer control unit 520, and notifies the transfer control unit 520 that the reading has been completed.

Next, the data control unit 520 gives an instruction to the data transfer unit 540 so to deliver to the network 60 among clusters the data which is transferred from the shared memory access unit 530 to the data transfer unit 540. At this time, additional information including a cluster identifier, writing address for the destination cluster of the transfer data, size of the transfer data, an operational instruction to a data transfer control unit of the destination cluster is added to the transfer data.

These data delivered from the data transfer unit 540 are transferred through the network 60 among clusters to a data transfer control unit 500 of the destination cluster 10 which is indicated by a cluster identifier in the additional information.

In the data transfer control unit 500 of the destination cluster 10, when the data transfer unit 540 accepts the received data, the unit 540 separates the additional information from the received data to send it to the transfer control unit 520. The transfer control unit 520 gives an instruction to the data transfer unit 540 and the shared memory access unit 530 so to write the data within the data transfer unit 540 into the shared memory 30 on the basis of the additional information. According to the instruction, the data transfer unit 540 reads out the written data and transfers the data to the shared memory access unit 530. The shared memory access unit 530 writes the written data delivered from the data transfer unit 540 into the shared memory 30 according to the instruction of the transfer control unit 520.

However, the above-mentioned conventional data transfer control device executes data transfer according to the order in which transfer instructions are received, independent of the case where there is an urgent transfer instruction. If the conventional data transfer control device accepts an urgent transfer instruction after a non-urgent transfer instruction, execution of the urgent transfer instruction will be queued until the execution of the precedent transfer instruction has been completed. As a result, the arithmetic processing unit which issued the transfer instruction must be also waiting for the completion of the transfer. Therefore, processing ability of the arithmetic processing unit cannot be used efficiently in some cases. Further, such queuing in the process of the arithmetic processing unit results in deteriorating the performance of the whole information processing system.

A transfer instruction requiring a large amount of data to be transferred, which is principally intended to perform only the data transfer itself, can be regarded as a non-urgent instruction. Accordingly, by preferentially transferring a transfer instruction requiring a small amount of data, an urgent transfer instruction can be prevented from being left behind, thereby making use of an arithmetic processing unit efficiently. Further, the deterioration of the performance in the information processing system can be prevented, which is resulted from queuing in the process of the arithmetic processing unit.

SUMMARY OF THE INVENTION

In order to dissolve the fault of the above-mentioned conventional data transfer control device, a first object of the present invention is to provide a data transfer control device which is able to transfer an urgent transfer instruction promptly, by preferentially transferring the transfer instruction requiring a small amount of data, thereby to make use of an arithmetic processing unit efficiently.

In addition to the first object, a second object of the present invention is to provide a data transfer control device which prevents the deterioration of the performance in the information processing system, which is resulted from queuing in the process of the arithmetic processing unit.

According to one aspect of the invention, a data transfer control device which is respectively provided in several clusters connected through a network among clusters for controlling data transfer between shared memories in the respective clusters, comprising:

an instruction decoding means for receiving an transfer instruction from an arithmetic processing unit provided in the cluster and decoding the content thereof;

some instruction storage means for storing the transfer instruction;

a shared memory access means for reading and writing the data through access to the shared memory provided in the cluster;

a data transfer means for delivering the data read out by the shared memory access means to the network among clusters, as well as delivering the received data through the network among clusters to the shared memory access means; and a transfer control means for controlling the shared memory access control means and the data transfer means according to the transfer instruction which is read out from the instruction storage means;

wherein said instruction decoding means classifies the transfer instruction into an urgent transfer instruction or a non-urgent transfer instruction on the basis of the decoded result thereof, so to store it into one of the instruction storage means separately, and said transfer control means reads out the transfer instruction preferentially from the instruction storage means which stores the urgent transfer instruction.

In the preferred construction, the instruction decoding means classifies the transfer instruction depending on whether the size of the transfer data to be transferred by the transfer instruction is within a predetermined transfer limit on the basis of the decoded result of the transfer instruction, stores the transfer instruction in one of the instruction storage means when the size of the transfer data is within the transfer limit, and stores the transfer instruction, which is divided in every unit of the predetermined process size, into the other instruction storage means when the size of the transfer data exceeds the transfer limit, while, the transfer control means reads out the transfer instruction preferentially from the instruction storage means which stores the transfer instruction when the transfer data thereof is within the transfer limit.

In the above-mentioned construction, with a priority given to the instruction storage means which stores the transfer instruction when the size of the transfer data thereof is within the transfer limit, the transfer control means reads out the transfer instructions alternatively from the both instruction storage means when the size of the transfer data designated by the transfer instruction exceeds the transfer limit and the transfer instruction is divided and stored also in the other instruction storage means.

Also, the transfer limit is defined by the use of TAT in the transfer between clusters as criterion.

In the preferred construction, the instruction decoding means judges whether the size of the transfer data to be transferred by the transfer instruction is within the predetermined transfer limit, when the size of the transfer data is judged within the transfer limit, further judges whether the transfer instruction is included in the category of the predetermined urgent transfer instruction, when the transfer instruction is included in the category of the urgent transfer instruction, stores the transfer instruction into one of the instruction storage means, when the transfer instruction is not included in the category of the urgent transfer instruction, stores the transfer instruction into the other instruction storage means, and stores the transfer instruction which demands a large size of the transfer data exceeding the transfer limit into the other instruction storage means, the transfer instruction being divided in every unit of the predetermined process size, while the transfer control means reads out the transfer instruction preferentially from the instruction storage means which stores the transfer instruction included in the category of the urgent transfer instruction.

In the preferred construction, with a priority given to the instruction storage means storing the transfer instruction included in the category of the urgent transfer instruction, said instruction decoding means reads out the transfer instructions alternatively from the both instruction storage means when the transfer instruction which is not included in the category of the urgent transfer instruction is stored also in the other instruction storage means or when the above mentioned divided transfer instruction is stored also in the other instruction storage means.

According to another aspect of the invention, a data transfer control device which is respectively provided in several clusters connected through a network among clusters for controlling data transfer between shared memories in the respective clusters, comprising:

an instruction decoding means for receiving an transfer instruction from an arithmetic processing unit provided in the cluster and decoding the content thereof;

a first and a second instruction storage means for storing the transfer instruction according to the decoded result by said instruction decoding means;

a shared memory access means for reading and writing the data through access to the shared memory provided in the cluster;

a data transfer means for delivering the data read out by the shared memory access means to the network among clusters, as well as delivering the received data through the network among clusters to the shared memory access means; and a transfer control means for controlling the shared memory access control means and the data transfer means according to the transfer instruction which is read out from the instruction storage means;

wherein said instruction decoding means classifies the transfer instruction depending on whether the size of the transfer data to be transferred by the transfer instruction is within the predetermined transfer limit on the basis of the decoded result thereof, stores the transfer instruction, which is divided in every unit of the predetermined process size, into the first instruction storage means when the size of the transfer data exceeds the transfer limit, and stores the transfer instruction into the second instruction storage means when the size of the transfer data is within the transfer limit, while said transfer control means reads out the transfer instruction preferentially from the second instruction storage means.

According to a further aspect of the invention, a data transfer control device which is respectively provided in several clusters connected through a network among clusters for controlling data transfer between shared memories in the respective clusters, comprising:

an instruction decoding means for receiving an transfer instruction from an arithmetic processing unit provided in the cluster and decoding the content thereof;

a first and a second instruction storage means for storing the transfer instruction according to the decoded result by said instruction decoding means;

a shared memory access means for reading and writing the data through access to the shared memory provided in the cluster, a data transfer means for delivering the data read out by the shared memory access means to the network among clusters, as well as delivering the received data through the network among clusters to the shared memory access means; and a transfer control means for controlling the shared memory access control means and the data transfer means according to the transfer instruction which is read out from the instruction storage means, wherein said instruction decoding means judges whether the size of the transfer data to be transferred by the transfer instruction is within the predetermined transfer limit on the basis of the decoded result of the transfer instruction, when the size of the transfer data is judged within the transfer limit, further judges whether the transfer instruction is included in the category of the predetermined urgent transfer instruction, stores the transfer instruction into the first instruction storage means when the transfer instruction is not included in the category of the urgent transfer instruction, stores the transfer instruction into the second instruction storage means when the transfer instruction is included in the category of the urgent transfer instruction, and stores the transfer instruction, which is divided in every unit of the predetermined size, into the first instruction storage means when the size of the transfer data exceeds the transfer limit, while said transfer control means reads out the transfer instruction preferentially from the second instruction storage means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a block diagram showing an organization of an information processing system in which a conventional data transfer control device is provided.

DESCRIPTION OF THE PREFERRED EMBODIMENT

A preferred embodiment of the present invention will be explained in detail by referring to the accompanying drawings.

Figure 1:
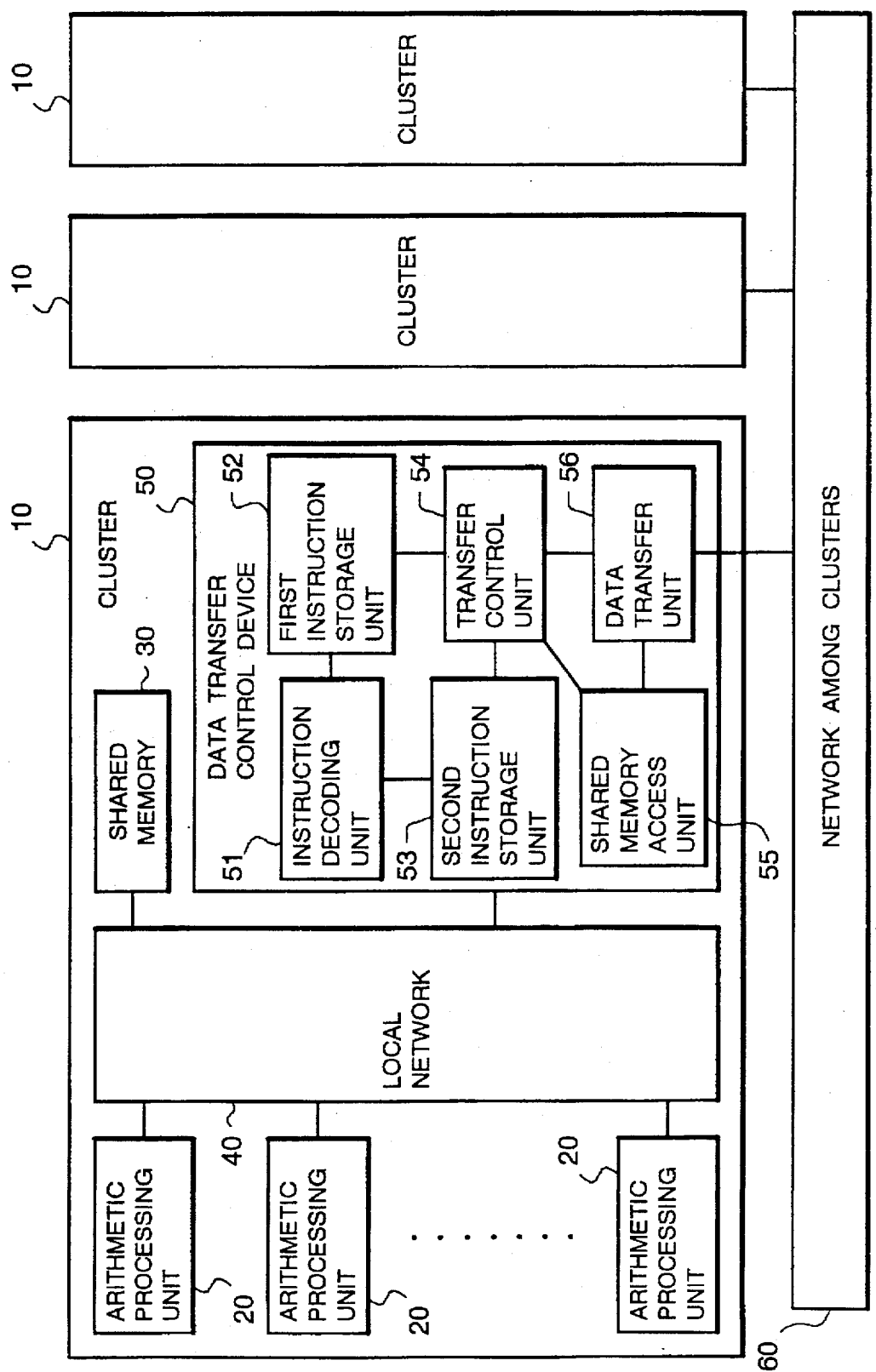
FIG. 1 is a block diagram showing an organization of an information processing system in which a data transfer control device according to the first embodiment of the present invention is provided.

FIG. 1 is a diagram showing an organization of an information processing system in which a data transfer control device according to the first embodiment of the present invention is used.

As illustrated, the information processing system used in this embodiment is comprised of several clusters 10 connected through a network 60 among clusters. Each cluster 10 comprises a plurality of arithmetic processing units 20, a shared memory 30 shared by the arithmetic processing units 20, a local network 40 connecting the arithmetic processing units 20 and the shared memory 30, and a data transfer control device 50 which is provided between the local network 40 and the network 60 among clusters so to control the data transfer between the shared memory 30 of the same cluster 10 and a shared memory of another cluster 10. Here in the figure, only a particular organization is indicated, while the other organization is omitted. Also, only an organization of one cluster 10 is explained in the figure, while organizations of the other clusters are omitted. However, every cluster has the same organization.

The data transfer control unit 50 of this embodiment comprises, as illustrated in FIG. 1, an instruction decoding unit 51 for receiving a transfer instruction from an arithmetic processing unit 20 and decoding the content thereof, a first instruction storage unit 52 and a second instruction storage unit 53 for storing the transfer instruction therein according to the decoded result by the instruction decoding unit 51, a shared memory access unit 55 for reading and writing the data through access to the shared memory 30 of the same cluster 10, a data transfer unit 56 for delivering data to the network 60 among clusters, and a transfer control unit 54 for controlling the shared memory access unit 55 and the data transfer unit 56. According to this embodiment, a transfer instruction issued by the arithmetic processing unit 20 is received by the data transfer control device 50, where the instruction decoding unit 51 starts decoding it. The transfer instruction, after having been decoded, will be stored in a corresponding instruction storage unit 52 or 53 according to the content of the transfer instruction.

The instruction decoding unit 51 is realized by a CPU controlled by program, and receives through a local network 40 a transfer instruction which is issued by the arithmetic processing unit 20 to be transferred from a shared memory 30 of a cluster 10 where the data comes out to a shared memory 30 of a cluster 10 where the data is sent. Then, the unit 51 decodes the content of the received transfer instruction. Owing to this, the size of the transfer data to be transferred by the transfer instruction and a cluster to which the data is sent can be specified.

The first instruction storage unit 52 is realized by a memory such as RAM or the like. Depending on the decoded result by the instruction decoding unit 51, the unit 52 stores a transfer instruction in the case where it is a special kind of instruction, or where it demands to transfer such a large amount of data exceeding a predetermined transfer limit.

The second instruction storage unit 53 is realized by a memory such as RAM or the like, and in the case where a transfer instruction decoded by the instruction decoding unit 51 is other than the instruction to be stored in the first instruction storage unit 52, the unit 53 stores the transfer instruction.

Figure 2:
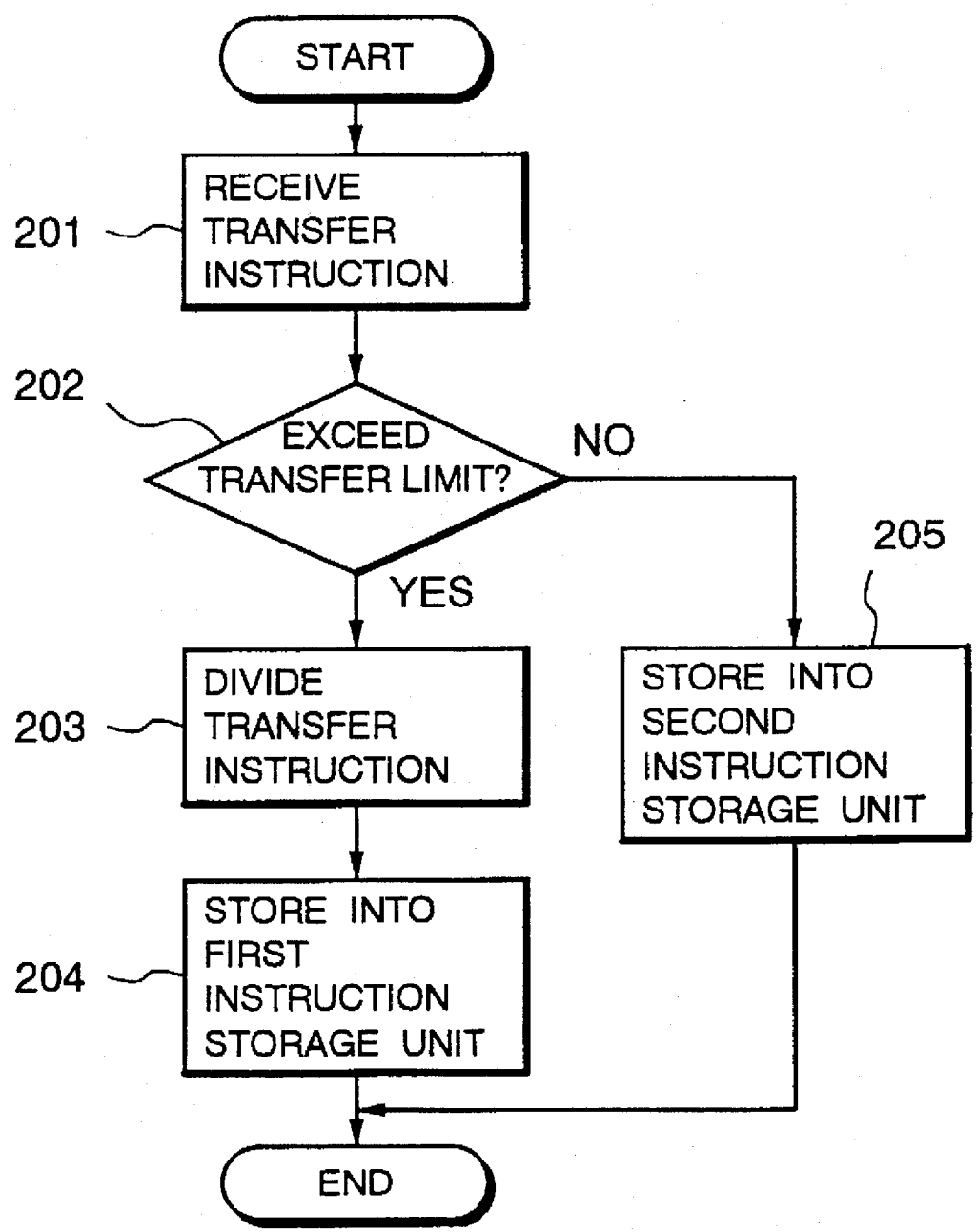
FIG. 2 is a flow chart showing an operation of an instruction decoding unit according to the first embodiment of the present invention.

This time, an operation for storing a transfer instruction into the first instruction storage unit 52 or the second instruction storage unit 53 by the instruction decoding unit 51 will be explained with reference to a flow chart of FIG. 2. Here, assume that which storage unit to be used for storing a transfer data is decided depending on the size of the transfer data designated by the transfer instruction.

At first, when the instruction decoding unit 51 receives a transfer instruction (Step 201), it makes a judgment whether the size of the transfer data designated by the received transfer instruction exceeds the predetermined transfer limit (Step 202). When the size of the transfer data exceeds the transfer limit, the unit 51 divides the transfer instruction in every unit of the predetermined processing size (Step 203), and stores the transfer instruction in the first instruction storage unit 52 as the transfer instruction of divided numbers (Step 204). While, when the size of the transfer data is within the transfer limit, the unit 51 stores the transfer instruction in the second instruction storage unit 53 as it is (Step 205).

In this way, the transfer instructions are classified depending on the size of each transfer data. Here, in case of classifying the transfer instructions depending on the size of each transfer data, it is necessary to define the transfer limit as criterion large enough to include the whole transfer data of any size in an urgent transfer instruction. With reference to, for example, TAT in the transfer between clusters as criterion, the transfer limit can be defined to make a judgment whether the transfer data should be divided or not.

Besides, the instruction decoding unit 51 can decide a storage unit to store a transfer instruction not only depending on the size of the transfer data as described above but also depending on the type of the transfer instruction. More specifically, the instruction decoding unit 51 makes a judgment about the type of a transfer instruction received from the arithmetic processing unit 20, and stores an urgent transfer instruction in the second instruction storage unit 53, and stores a non-urgent transfer instruction in the first instruction storage unit 52. Further, a storage unit for storing a transfer instruction may be decided depending on a combination of the type of a transfer instruction and the size of a transfer data. Two instruction storage units are prepared in this embodiment. However, more than two instruction storage units may be prepared, so that transfer instructions may be classified on the basis of a proper condition thereby to decide a storage unit.

The transfer control unit 54 is realized by a CPU controlled by program. The unit 54 reads out transfer instructions from the first instruction storage unit 52 or the second instruction storage unit 53 in a predetermined order and controls the shared memory access control unit 55 and the data transfer unit 56 according to the content of the read out transfer instruction. In the order of reading out the transfer instructions, priority is given to the second instruction storage unit 53 by using a round robin method, and when transfer instructions are stored in the both instruction storage units 52 and 53, the transfer instructions are alternatively read out therefrom. The transfer control unit 54 controls the shared memory access unit 55 and the data transfer unit 56 similarly to the data control unit in the conventional data transfer control device. Namely, the transfer control unit 54 gives an instruction to the shared memory access unit 55 so to read out data from a shared memory in every unit of data transfer process, and gives an instruction to the data transfer unit 56 so to deliver to the network 60 among clusters the data which is delivered by the shared memory access unit 55 to the data transfer unit 56.

The shared memory access unit 55 is realized by a CPU controlled by program. According to the instruction of the transfer control unit 54, the unit 55 reads out a desired data from the shared memory 30 to send it to the data transfer unit 56, notifies the transfer control unit 54 that the data has been obtained and writes the data received from the data transfer unit 54 into the shared memory 30, similarly to the shared memory access unit in the conventional data transfer control device.

The data transfer unit 56 is realized by a CPU controlled by program. According to the instruction of the transfer control unit 54, the unit 56 delivers the data received from the shared memory access unit 55 to the network 60 among the clusters, sends the data received through the network 60 among the clusters to the shared memory access unit 55 and notifies the transfer control unit 54 of the data being received, similarly to the data transfer unit in the conventional data transfer device.

This time, assuming that the instruction decoding unit 51 classifies transfer instructions on the basis of the size of transfer data, an operation in this embodiment will be explained by way of example of the case where some transfer instructions requiring various size of transfer data are issued.

Assume that a transfer instruction A requiring a larger size of transfer data beyond the transfer limit and transfer instructions B and C both requiring a size of transfer data within the transfer limit are issued from an arithmetic processing unit 20 in the order of A, B and C. Further, assume that the transfer instructions are all to be transferred to another cluster (a destination cluster or a cluster where the data is sent) from a cluster (where the data comes out) provided with the arithmetic processing unit 20 which issued the transfer instruction.

First, the instruction decoding unit 51 receives the transfer instruction A and judges the size of the transfer data thereof. Detecting the size of the transfer data designated by the transfer instruction A exceeding the transfer limit, the unit 51 writes the transfer instruction A which is divided in every unit of the predetermined process into the first instruction storage unit 52. More specifically, the transfer instruction A is written in the first instruction storage unit 52 according to the size of the transfer data, for example, as ten pieces of transfer instructions from A1 to A10.

Next, the instruction decoding unit 51 receives the transfer instruction B and judges the size of the transfer data thereof. Detecting the size of the transfer data designated by the transfer instruction B within the transfer limit, the unit 51 writes the transfer instruction B into the second instruction storage 53. Then, the instruction decoding unit 51 receives the transfer instruction C. Detecting the size of the transfer data thereof within the transfer limit, the unit 51 writes the transfer instruction C into the second instruction unit 53 similarly to the transfer instruction B.

This time, the transfer control unit 54 reads out, in the predetermined order, the transfer instructions stored in the first instruction storage unit 52 and the second instruction storage unit 53, thereby executing the data transfer. Here, the transfer instructions are to be alternatively read out from the first instruction storage 52 and the second instruction storage unit 53.

The transfer control unit 54 reads out the transfer instruction A1 from the first instruction storage unit 52. According to the content of the instruction, the unit 54 gives an instruction to the shared memory access unit 55 so to read out the required data through access to the shared memory 30 and deliver the read out data to the data transfer unit 56. The shared memory access unit 55 reads out the data from the shared memory 30 so to deliver the data to the data transfer unit 56, and simultaneously notifies the transfer data control unit 54 that the data has been obtained.

Receiving a notice that the data has been obtained from the shared memory access unit 55, the transfer control unit 54 gives an instruction to the data transfer unit 56 so to add the additional information for transfer control to the transfer data and deliver such data to the network 60 among clusters. The additional information means the data for use in the transfer control, including operational instruction for the transfer control unit 54 in the data transfer control device 50 provided in a cluster 10 where the data is sent, identifier data of a cluster where the data is sent, identifier data of the data transfer control device in a cluster where the data is sent, identifier data of a cluster where the data comes out, identifier data of the data transfer control device in a cluster where the data comes out. Besides, in the case where a cluster or a user has ID, such ID should be included in the additional information. The operational instruction for a cluster where the data is sent includes a command designating the type of transfer instruction, a starting address in the shared memory, and the size of transfer data or the like.

Next, the data transfer unit 56, adding the additional information received from the transfer control unit 54 to the transfer data received from the shared memory access unit 55, delivers the data to the network 60 among clusters.

After this, the transfer instructions are read out from the second instruction storage unit 53 and the first instruction storage unit 52 by turns, thereby to execute the transfer process in the order of the transfer instructions B, A2, C, A3, A4, ... A10.

The additional information and the transfer data delivered from the data transfer unit 56 to the network 60 among clusters are received by a data transfer control device 50 in a cluster 10 where the data is sent, and written into a shared memory 30 in the same cluster 10 according to the content of the additional information. The data receiving operation and writing operation into the shared memory 30 by the data transfer control device 50 is similar to that in the conventional data transfer control device.

The data transfer is completed in these way. As mentioned above, the transfer instruction which requires transfer data larger than the predetermined transfer limit is divided into proper size, so to be transferred in several times. While, the transfer instruction which requires a small size of transfer data is executed interposed therebetween. Therefore, an urgent transfer instruction, namely, a transfer instruction which requires a small size of data can be transferred more promptly.

Next, a data transfer control device according to the second embodiment of the present invention will be explained.

The data transfer control device of the second embodiment has the same structure as the data transfer control device of the first embodiment of FIG. 1. In the second embodiment, each unit other than the instruction decoding unit 51 is similar to that of the above-mentioned first embodiment, so that the explanation thereof is omitted.

An instruction decoding unit 51 of the second embodiment, similarly to the instruction decoding unit 51 of the first embodiment, decodes the content of a transfer instruction issued from an arithmetic processing unit 20 and judges the size of the transfer data designated by the transfer instruction. Further, the unit 51 makes a judgment whether this transfer instruction is included in the category of the urgent transfer instruction which is defined in advance and selects a storage unit so to store this transfer instruction therein.

Figure 3:
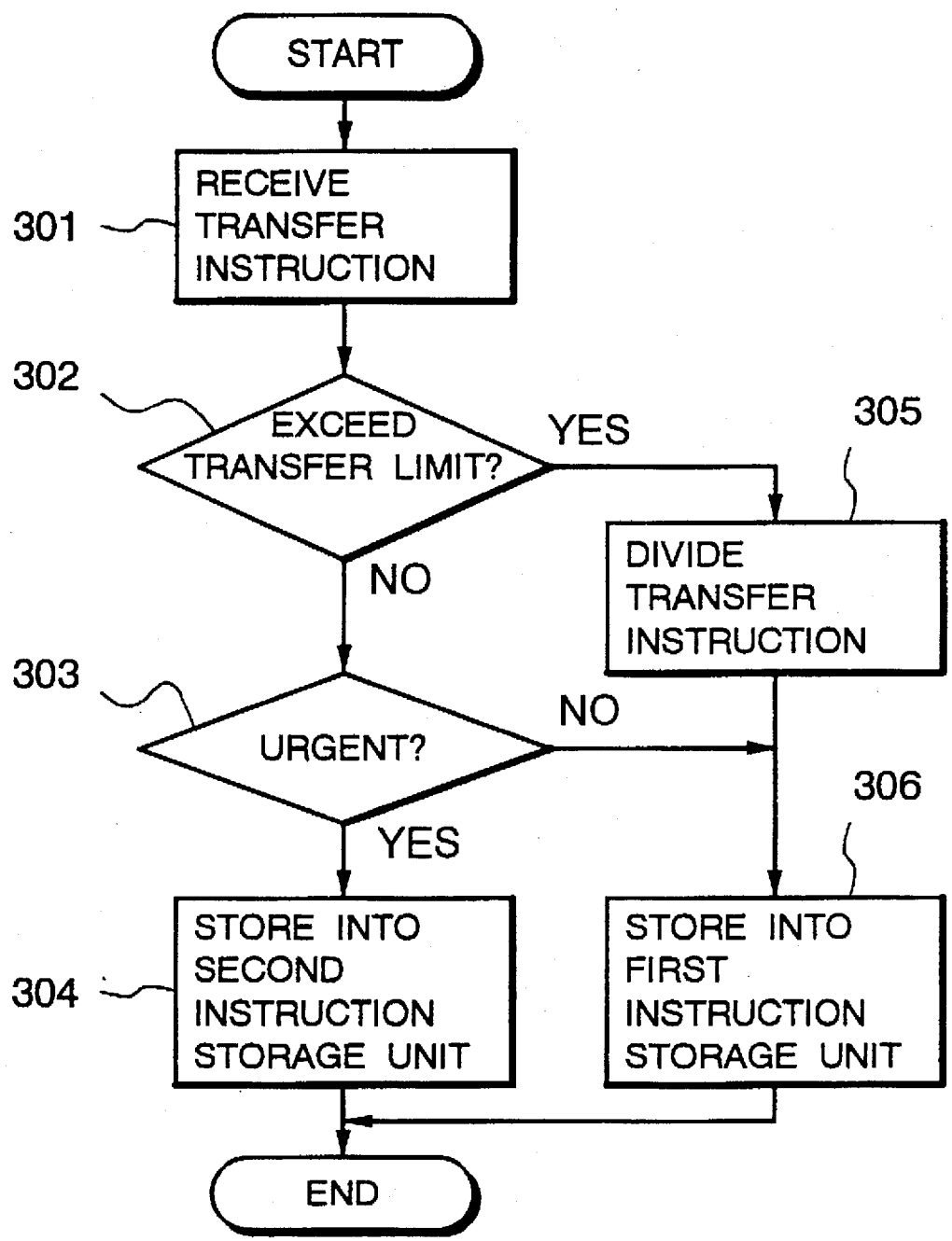
FIG. 3 is a flow chart showing an operation of an instruction decoding unit according to the second embodiment of the present invention.

This time, an operation for storing transfer instruction into the first instruction storage unit 52 and the second instruction storage unit 53 by the instruction decoding unit 51 will be explained with reference to a flow chart of FIG. 3.

At first, when the instruction decoding unit 51 receives a transfer instruction (Step 301), the unit 51 judges whether the size of the transfer data exceeds the transfer limit which is defined in advance (Step 302). When the size of the transfer data exceeds the transfer limit, the unit 51 divides the transfer instruction in every unit of the predetermined process size (Step 305), and stores the transfer instruction into the first instruction storage unit 52 as the transfer instruction of divided numbers (Step 306). While, when the size of the transfer data is within the transfer limit, the unit 51 makes a judgment whether the corresponding transfer instruction is included in the category of the predetermined urgent transfer instruction which is defined in advance (Step 303). Then, when the corresponding transfer instruction is judged as the urgent transfer instruction, it shall be stored into the second instruction storage unit 53 (Step 304). On the contrary, when the transfer instruction is not included in the category of the urgent transfer instruction, it shall be stored into the first instruction storage unit 52 (Step 306).

In this way, transfer instructions are classified on the basis of the type of the respective transfer instruction. With respect to the transfer instructions of small size of transfer data, further classification is performed on the basis of the type thereof. Therefore, only really urgent transfer instructions can be transferred preferentially, while eliminating other transfer instructions of small size of transfer data and non-urgent transfer instructions.

Also, in the second embodiment, a transfer instruction of a large size of transfer data is divided so to be stored in the first instruction storage unit 52. Even if an urgent transfer instruction is issued after a transfer instruction of a large size of transfer data, the urgent transfer instruction can be transferred immediately, by reading out transfer instructions alternatively from the second instruction storage unit 53 and the first instruction storage unit 52, similarly to the case of the first embodiment.

As set forth hereinabove, the data transfer processing device of the present invention can move an urgent transfer instruction immediately by classifying transfer instructions according to the size of the transfer data designated by the respective transfer instructions and transferring a transfer instruction of a small size of transfer data preferentially, thereby to realize the efficient use of an arithmetic processing unit.

Further, the data transfer processing device of the present invention can avoid queue of an arithmetic processing unit, thereby to prevent the resultant deterioration of performance in the information processing system.

Moreover, after classifying the transfer instructions on the basis of the transfer data size, the transfer instructions are further classified on the basis of the type thereof. Accordingly, only a very urgent transfer instruction is preferentially transferred in the present invention, thereby to realize the efficient use of an arithmetic processing unit.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data transfer control device which is respectively provided in several clusters connected through a network among clusters for controlling data transfer between shared memories in the respective clusters, comprising:
   an instruction decoding means for receiving transfer instruction from an arithmetic processing unit provided in the cluster and decoding the content thereof;

a plural instruction storage means for storing the transfer instruction;

a shared memory access means for reading and writing the data through access to the shared memory provided in the cluster;

a data transfer means for delivering the data read out by the shared memory access means to the network among clusters, and delivering the received data through the network among clusters to the shared memory access means; and a transfer control means for controlling the shared memory access means and the data transfer means according to the transfer instruction which is read out from the instruction storage means;

wherein said instruction decoding means classifies the transfer instruction into an urgent transfer instruction or a non-urgent transfer instruction on the basis of the decoded result thereof, so to store it into one of the instruction storage means separately, and said transfer control means reads out the transfer instruction preferentially from the instruction storage means which stores the urgent transfer instruction.

2. A data transfer control device as set forth in claim 1 wherein said instruction decoding means classifies the transfer instruction depending on whether the size of the transfer data to be transferred by the transfer instruction is within a predetermined transfer limit on the basis of the decoded result of the transfer instruction, stores the transfer instruction in one of the instruction storage means when the size of the transfer data is within the transfer limit, and stores the transfer instruction, which is divided in every unit of the predetermined process size, into the other instruction storage means when the size of the transfer data exceeds the transfer limit, while, said transfer control means reads out the transfer instruction preferentially from the instruction storage means which stores the transfer instruction when the transfer data thereof is within the transfer limit.

3. A data transfer control device as set forth in claim 2 wherein with a priority given to the instruction storage means which stores the transfer instruction when the size of the transfer data thereof is within the transfer limit, said transfer control means reads out the transfer instructions alternatively from the both instruction storage means when the size of the transfer data designated by the transfer instruction exceeds the transfer limit and the transfer instruction is divided and stored also in the other instruction storage means.

4. A data transfer control device as set forth in claim 2 wherein the transfer limit is defined by the use of TAT in the transfer between clusters as criterion.

5. A data transfer control device as set forth in claim 1 wherein said instruction decoding means judges whether the size of the transfer data to be transferred by the transfer instruction is within the predetermined transfer limit, when the size of the transfer data is judged within the transfer limit, further judges whether the transfer instruction is included in the category of the predetermined urgent transfer instruction, when the transfer instruction is included in the category of the urgent transfer instruction, stores the transfer instruction into one of the instruction storage means, when the transfer instruction is not included in the category of the urgent transfer instruction, stores the transfer instruction into the other instruction storage means, and stores the transfer instruction which demands a large size of the transfer data exceeding the transfer limit into the other instruction storage means, the transfer instruction being divided in every unit of the predetermined process size, while said transfer control means reads out the transfer instruction preferentially from the instruction storage means which stores the transfer instruction included in the category of the urgent transfer instruction.

6. A data transfer control device as set forth in claim 1 wherein with a priority given to the instruction storage means storing the transfer instruction included in the category of the urgent transfer instruction, said instruction decoding means reads out the transfer instructions alternatively from the both instruction storage means when the transfer instruction which is not included in the category of the urgent transfer instruction is stored also in the other instruction storage means or when the above mentioned divided transfer instruction is stored also in the other instruction storage means.

7. A data transfer control device which is respectively provided in several clusters connected through a network among clusters for controlling data transfer between shared memories in the respective clusters, comprising:

an instruction decoding means for receiving an transfer instruction from an arithmetic processing unit provided in the cluster and decoding the content thereof;

a first and a second instruction storage means for storing the transfer instruction according to the decoded result by said instruction decoding means;

a shared memory access means for reading and writing the data through access to the shared memory provided in the cluster;

a data transfer means for delivering the data read out by the shared memory access means to the network among clusters, and delivering the received data through the network among clusters to the shared memory access means; and a transfer control means for controlling the shared memory access means and the data transfer means according to the transfer instruction which is read out from the instruction storage means;

wherein said instruction decoding means classifies the transfer instruction depending on whether the size of the transfer data to be transferred by the transfer instruction is within the predetermined transfer limit on the basis of the decoded result thereof, stores the transfer instruction, which is divided in every unit of the predetermined process size, into the first instruction storage means when the size of the transfer data exceeds the transfer limit, and stores the transfer instruction into the second instruction storage means when the size of the transfer data is within the transfer limit, while said transfer control means
reads out the transfer instruction preferentially from the second instruction storage means.

8. A data transfer control device as set forth in claim 7 wherein
with a priority given to the second instruction storage means, said transfer control means reads out the transfer instructions alternatively from the both instruction storage means when the transfer instruction requiring a large size of the transfer data exceeding the transfer limit is divided and stored also in the first instruction storage means.

9. A data transfer control device as set forth in claim 7 wherein the transfer limit is defined by the use of TAT in the transfer between clusters as criterion.

10. A data transfer control device which is respectively provided in several clusters connected through a network among clusters for controlling data transfer between shared memories in the respective clusters, comprising:
an instruction decoding means for receiving an transfer instruction from an arithmetic processing unit provided in the cluster and decoding the content thereof;
a first and a second instruction storage means for storing the transfer instruction according to the decoded result by said instruction decoding means;
a shared memory access means for reading and writing the data through access to the shared memory provided in the cluster, a data transfer means for delivering the data read out by the shared memory access means to the network among clusters, and delivering the received data through the network among clusters to the shared memory access means; and
a transfer control means for controlling the shared memory access means and the data transfer means according to the transfer instruction which is read out from the instruction storage means,
wherein said instruction decoding means
judges whether the size of the transfer data to be transferred by the transfer instruction is within the predetermined transfer limit on the basis of the decoded result of the transfer instruction,
when the size of the transfer data is judged within the transfer limit, further judges whether the transfer instruction is included in the category of the predetermined urgent transfer instruction,
stores the transfer instruction into the first instruction storage means when the transfer instruction is not included in the category of the urgent transfer instruction,
stores the transfer instruction into the second instruction storage means when the transfer instruction is included in the category of the urgent transfer instruction, and
stores the transfer instruction, which is divided in every unit of the predetermined size, into the first instruction storage means when the size of the transfer data exceeds the transfer limit, while
said transfer control means
reads out the transfer instruction preferentially from the second instruction storage means.

11. A data transfer control device as set forth in claim 10 wherein
with a priority given to the second instruction storage means, said instruction decoding means reads out the transfer instructions alternatively from the both instruction storage means when the first instruction storage means also stores the transfer instruction which is not included in the category of the urgent transfer instruction or when the first instruction storage means also stores the divided transfer instruction.

* * * * *